United States Patent
Pavone (10) Patent No.: US 6,652,754 B1
(45) Date of Patent: Nov. 25, 2003

(54) PROCESS FOR DETERMINING BY SIMULATION THE OPTIMUM STABILIZATION CONDITIONS OF A SIMULATED MOVING BED SEPARATION SYSTEM

(75) Inventor: Didier Pavone, Chemin de la Pinède (FR)

(73) Assignee: Institut Francais du Petrole, Cedex (FR)

(*) Notice: Subject to any disclaimer, the term of this patent is extended or adjusted under 35 U.S.C. 154(b) by 0 days.

(21) Appl. No.: 09/716,280

(22) Filed: Nov. 21, 2000

(30) Foreign Application Priority Data

Nov. 22, 1999 (FR) .............................. 99 14763

(51) Int. Cl.⁷ .............................. B01D 15/08
(52) U.S. Cl. .................. 210/659; 210/662; 210/739
(58) Field of Search ................ 210/662, 739, 210/659, 672; 585/821

(56) References Cited

U.S. PATENT DOCUMENTS

| | | | |
|---|---|---|---|
| 4,182,633 A | * 1/1980 | Ishikawa et al. ........... | 210/96.1 |
| 5,102,553 A | * 4/1992 | Kearney et al. ............ | 210/662 |
| 5,470,482 A | 11/1995 | Holt .......................... | 210/662 |
| 5,902,486 A | 5/1999 | Couenne et al. ............ | 210/659 |

OTHER PUBLICATIONS

Proll et al Optimization strategy for simulated moving bed systems, Journal of Chromatography, vol. 800, 1998 pp. 135–150.

Hassan et al "Modelling of simulated moving bed adsorption system" Separations Technology, Col. 5, 1995, pp. 77–89.

* cited by examiner

Primary Examiner—Ivars Cintins
(74) Attorney, Agent, or Firm—Antonelli, Terry, Stout & Kraus, LLP

(57) ABSTRACT

A process for determining by simulation the optimum stabilization conditions of a simulated moving bed (SMB) separation system allows to obtain set values for the purity of an extracted constituent and for the efficiency. In order to determine the optimum flow rates, a single simulation is carried out, which includes a succession of stages intended for rectification of the fluid flow rates during limited time intervals (T), including each, after each time interval, comparison of the respective purity degrees and efficiencies obtained, resulting from situations stemming from simulations over a time interval ($\Delta t$) where rectifications are applied to at least one flow rate, with those of a reference situation resulting from a simulation over the same time interval but without flow rate rectification, followed by a selection of flow rates aimed to minimize the quantity of impurities in the extract and the quantity of constituent in the raffinate.

7 Claims, 6 Drawing Sheets

PROCESS FOR DETERMINING BY SIMULATION THE OPTIMUM STABILIZATION CONDITIONS OF A SIMULATED MOVING BED SEPARATION SYSTEM

FIELD OF THE INVENTION

The present invention relates to a process for determining by simulation the optimum stabilization conditions of a simulated moving bed separation system allowing to rapidly reach set values fixed for the purity of an extracted constituent and for the plant efficiency.

The method is notably suited for separation of aromatic hydrocarbons or of optical isomers.

BACKGROUND OF THE INVENTION

In industry, there are many continuous separation processes using selective adsorption of at least one component among several within a mixture of fluids, notably chromatography processes where the property of certain porous solids, in the presence of liquid, gaseous or supercritical mixtures, of retaining, to a more or less high degree, the various constituents of a mixture is used.

Separation or fractionation processes based on chromatography are most often implemented in a device comprising (FIG. 1) a series of k chromatographic columns or column sections connected in series (generally $4 \leq k \leq 24$), forming an open or closed loop. A porous solid of determined grain size, distributed over various beds, constitutes the stationary phase.

Injection points for the mixture to be separated F, comprising at least two constituents A, B and the solvent or desorbent, and fluid draw-off points delimiting most often four zones Z1, Z2, Z3, Z4 are distributed along this loop, the constituent that is preferably wanted being in most cases either in the extract (Ex) or in the raffinate (Raf). An identical flow of liquid runs through all the columns or column sections of a zone. In a real countercurrent process, a fixed and constant concentration profile develops along a separation column 1 (FIG. 1), where the position of the points of injection of a feed A+B, of an eluent S, and of draw-off of an extract Ex and of a raffinate Raf remains fixed. Adsorbent solid 3 and liquid 2 circulate in a countercurrent flow. A solid carrying system and a recycling pump P, both placed on the location of the column (at the junction of zones Z1 and Z4 where the only species present in the liquid as well as in the solid is the elution carrier fluid), allow respectively to drive the solid from the bottom to the top, and conversely the liquid from the top to the bottom.

Processes known as simulated countercurrent (SCC) or simulated moving bed (SMB) processes allow, as it is well known, to avoid a major difficulty inherent in real moving bed processes, which consists in correctly circulating the solid phase without creating attrition and without considerably increasing the bed porosity in relation to that of a fixed bed. In order to simulate the displacement thereof, the solid is placed in a certain number n of fixed beds arranged in series and it is the concentration profile which is displaced at a substantially uniform rate all around an open or closed loop, by moving the injection and draw-off points.

In practice, successive shifting of these injection and draw-off points is performed by means of a rotary valve or, more finely, of a series of suitably controlled on-off valves. This circular shifting, performed at each period, of the various incoming-outgoing liquid flows in a given direction, amounts to simulating a displacement of the solid adsorbent in the opposite direction.

The main incoming liquid flows are as follows: the flow of feed $Q_F$ and the flow of eluent $Q_{El}$. The outgoing flows are the flow of extract and the flow of raffinate. At least one of these flows (raffinate, eluent, extract) is withdrawn or introduced under pressure control. The flow of raffinate $Q_{Raf}$ is the sum of the incoming flows $Q_F$ and $Q_{El}$ minus the flow of extract $Q_{Ex}$. A recycle rate $Q_{Rec}$ adds further to these controlled flows. The respective locations of the four flows around the beds thus define four distinct zones.

An example of well-known processes is the Eluxyl™ process, which is notably described in the following patents: EP-415,822 (U.S. Pat. No. 5,114,590) or FR-2,762,793 (U.S. Pat. No. 5,902,486).

The parameters necessary for operation of a separation loop are difficult to determine because the variables involved in the process are numerous.

For a given supply concentration, these flow rates can be found empirically but the optimum solution lies in a restricted zone of a four-dimensional space (three liquid flow rates and either the solid rate in the case of a real moving bed, or the permutation period T in the case of a simulated moving bed, the raffinate flow rate being deduced from the other flow rates), which can only be obtained by trial and error after a considerable length of time, without being certain that the optimum point has been reached.

In order to find optimum conditions for controlling or dimensioning a real moving bed (RMB) or a simulated moving bed (SMB) separation system, it is preferable to find a model representative of the separation process, taking account of adsorption phenomena, matter transfer and the flow properties of the fluid flowing through the porous solid phase, and to replace the unwieldy empirical approach by simulations. This approach by simulation can however be just as unwieldy if it is not carried out properly.

Processes are generally optimized according to a static optimization, by means of the well-known trial and error technique. One starts from a set of data (flow rates for example) selected a priori. A simulation is performed until stabilized conditions are obtained (hence the term static), and the performances obtained are recorded. After slightly modifying an input datum, a new simulation is performed in order to measure the sensitivity of the performances to this modification. This is iterated for all the data in order to similarly determine their respective influences on the evolution of the performances. The input data are then modified in the sense of a performance improvement.

There are many strategies for carrying out sensitivity calculation and for determining the way to modify the data. However, all of them have more or less the same drawbacks. They require many simulations, therefore an appreciable calculating time. They are blind and do not use knowledge that one might have a priori. They find a solution if they are initialized close to this solution but they diverge most of the time if they are initialized too far from the solution sought. Furthermore, they may <<fall>> into a local minimum and remain within.

SUMMARY OF THE INVENTION

The process according to the invention relates to a simulated moving bed (SMB) type separation system comprising a series of beds containing an adsorbent solid matter, divided into several zones delimited by points of injection of a feed and of an eluent and by points of withdrawal of an extract and of a raffinate, fluid injection means, fluid extraction means, means intended for permutation of the injection points and of the draw-off points, and means for measuring operating variables. The process allows fast determination of the optimum injected fluid flow rates and withdrawn fluid flow rates in order to obtain a purity degree (P) and an extraction efficiency (R) set for at least one constituent in extract (Ex).

It comprises a single dynamic type simulation with a succession of stages intended for rectification of the fluid flow rates at limited time intervals comprising each, after each time interval (T) the steps of:

comparing the respective purity degrees and efficiencies obtained, resulting from situations stemming from simulation stages over a determined time interval ($\Delta t$) where rectifications are applied to at least one flow rate, with those of a reference situation resulting from a simulation stage without flow rate rectification, over the same time interval, selecting flow rate rectifications minimizing the quantity of impurities converging to the extract draw-off point, as long as the desired purity degree has not been reached, and selecting flow rate rectifications minimizing the quantity of said constituent converging to the raffinate draw-off point, as long as the desired efficiency has not been reached.

The process can also comprise maximizing the purity degree or the efficiency when these two parameters simultaneously exceed the set values.

According to a first embodiment, after each stage, a first situation where the recycle rate is modified and a second situation where the extract flow rate is modified are compared with the reference situation.

According to a second embodiment, after each stage, a first situation where the recycle rate and the extract flow rate are modified by the same quantity and a second situation where the extract flow rate is decreased while the recycle rate is kept constant are compared with the reference situation.

The process comprises for example determining the net impurity flow $F_P$ entering the extract coming from the two zones on either side of the extract draw-off point, as well as the net flow $F_R$ of said constituent entering the raffinate coming from the two zones on either side of the raffinate draw-off point, from flows measured in each one of the four zones.

Instead of a multitude of static optimization cycles which are brought to completion from an initial set of flow rate modifications, a single cycle is carried out but it appeals to the optimizer at close intervals. By means of comparisons made at each time interval of the cycle, it can determine the optimum combination of flow rate values which is the most suitable for reaching the purity and efficiency objectives. Thus, by using successive alterations applied to the optimizer at reduced time intervals, fast operation stabilization is obtained, much faster than by simulation of a complete stabilization cycle of the separation system.

BRIEF DESCRIPTION OF THE DRAWINGS

Other features and advantages of the process according to the invention will be clear from reading the description hereafter of a non limitative example, with reference to the accompanying drawings wherein.

DETAILED DESCRIPTION

Figure 1:
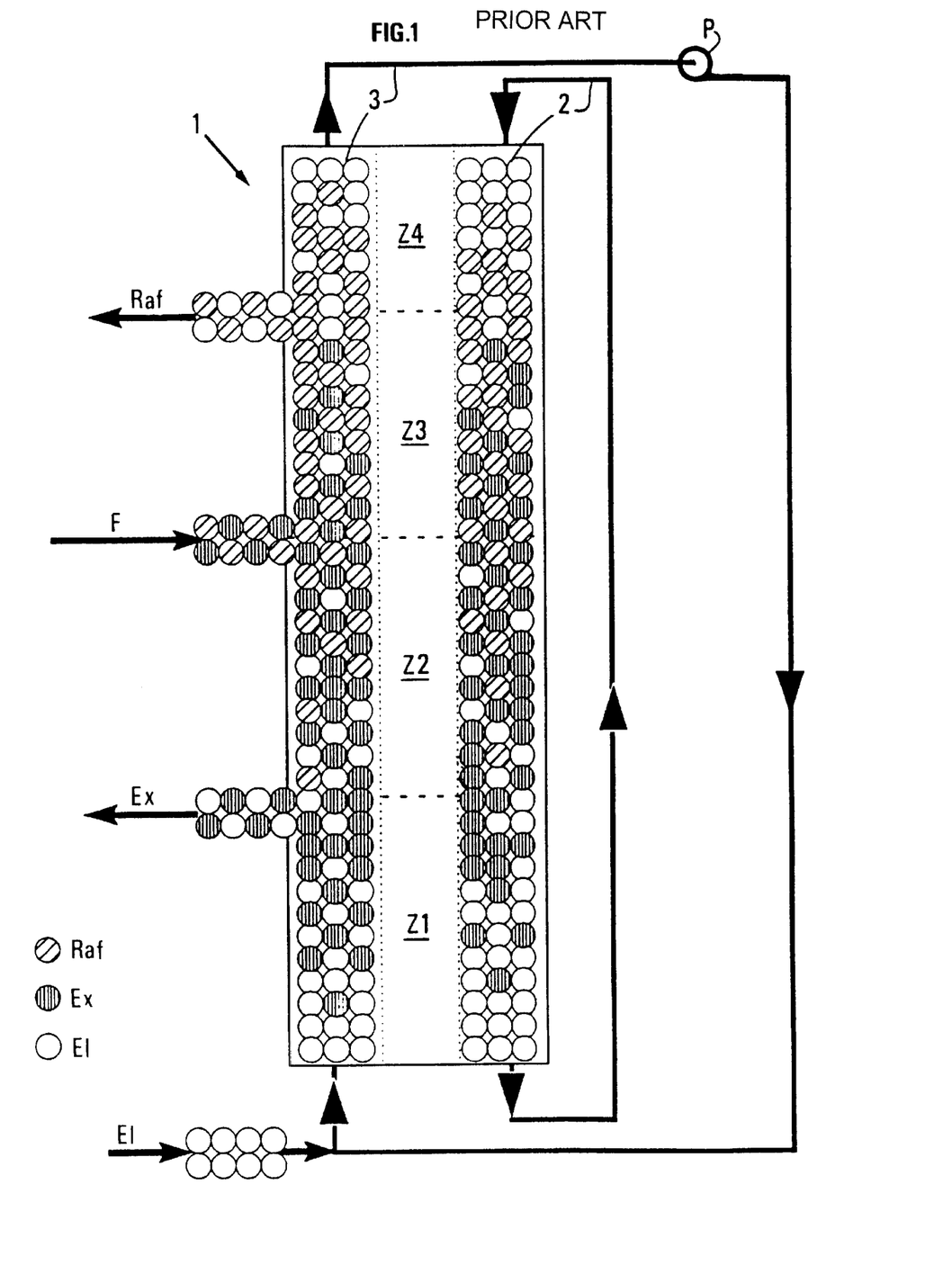
FIG. 1 diagrammatically shows a real moving bed (RMB) type separation system.

We consider a separation loop 1 as diagrammatically shown in FIG. 1 intended for example for isolation of an extract such as paraxylene Px in a feed F also containing pollutants such as orthoxylene Ox, metaxylene Mx and ethylbenzene Eb.

Operation of the loop is simulated by means of a model of a well-known type with solution of conventional simulation equations by conventional calculation means and optimization means or optimizer in order to carry out the selection stages according to the process. One of the models described in the following documents can for example be used as the model:

Hassan M. M. et al; <<Modelling of Simulated Moving Bed Adsorption System: a More Precise Approach>> in Separations Technology 5 (1995) 77–89, Elsevier, or Storti G. et al; <<Optimal Design of Multicomponent Countercurrent Adsorption Separation Processes involving Nonlinear Equilibria >> in Chemical Engineering Science, vol.44 No.6, pp.1329–1345 (1989), or Ching C. B. et al; <<Experimental and Modelling Studies on the Transient Behavior of a Simulated Countercurrent Adsorber >> in Journal of Chemical Engineering of Japan, vol.24 No.5, pp.614–621 (1991), or Rhee H-K et al; <<Multicomponent Adsorption in Continuous Countercurrent Exchangers >>, vol.269 A. 1194 (1971).

Simple observation allows to see that the purity increases if the quantity of pollutants (Mx, Ox and Eb) converging to extract Ex, either from upstream (from zone Z2), or from downstream (from zone Z1), is reduced. Similarly, the efficiency is increased if the quantity of Px entering raffinate Raf from downstream (zone Z3) or from upstream (zone Z4) is reduced.

It has to be known whether the impurity in the extract comes from upstream, in which case the flow rate in zones Z2 and Z3 has to be increased, or from downstream, in which case the flow rate in zones Z1 and Z4 has to be decreased. The problem is similar for paraxylene Px in raffinate Raf, which influences the efficiency.

In this example, the flow rates in zones Z2 and Z3 are linked because the flow rate of feed F injected between them (imposed by the operator) is not modified. Similarly, as it is assumed that the ratio of the flow rate of solvent S to the flow rate of feed F is subject to economic considerations, which imposes a certain flow rate of eluent S, the flow rates in zones Z1 and Z2 are also linked.

The principle on which the process is based consists in performing a dynamic optimization. Instead of carrying out several successive simulations where the optimizer performing the simulations from a set of input data always carries the simulation calculations through to completion (static optimization), a single simulation is carried out but by appealing to the optimizer in stages at regular time intervals (T) throughout the optimization procedure.

We consider the general case where n flow rates are to be optimized. Starting from any initial situation Si(t) at a time t (FIG. 2), the dynamic simulation is continued without any flow rate modification over a sufficient period $\Delta t (\Delta t=500$ s for example). A new situation $S_0(t+\Delta t)$ is obtained, suffix 0 meaning that the flow rates have not been changed. One then starts again from the same initial situation Si(t) and the evolution of the loop is simulated over the same period $\Delta t$ after having substantially modified the value of one of the flow rates to be optimized. A situation $S_1(t+\Delta t)$ is reached. By similarly modifying a second flow rate to be optimized, a situation $S_2(t+\Delta t)$ is obtained. The same operation is repeated for each one of the n flow rates to be optimized and n different situations $S_i(t+\Delta t)$ are eventually obtained, with i=1 to n. The optimizer then makes a first selection. It determines the variations or rectifications to be applied to the various flow rates either to increase or to reduce them, so as to minimize the quantity of impurities converging to the extract draw-off point and the quantity of said constituent converging to the raffinate draw-off point or, in other words, to determine the best flow rate variations compatible with the set purity and efficiency objectives.

Figure 2:
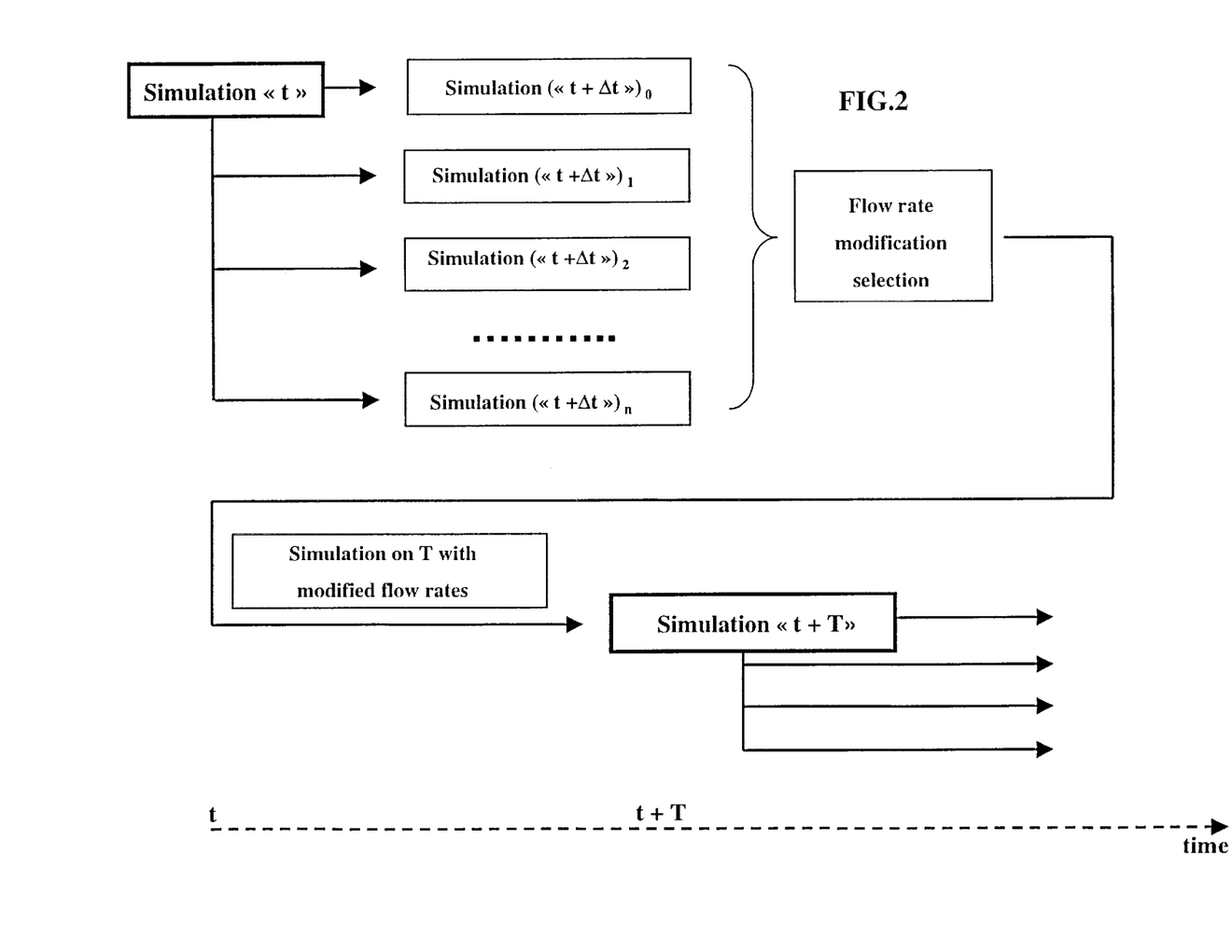
FIG. 2 diagrammatically shows the general case where, at a given time t of the dynamic optimization performed according to the process of the invention, n different situations resulting from simulations carried out in a time interval ($\Delta t$) stemming from modifications made or not to flow rates to be optimized are compared, FIG. 3 diagrammatically shows a particular case where, at a time t of the dynamic optimization performed according to the process of the invention, three different situations resulting from simulations carried out in a time interval ($\Delta t$), which are the result of modifications made to two flow rates, are compared.

From these updated flow rates, starting from the same initial time t, the previous simulation operation is iterated similarly, with comparison between the updated new initial situation and n other situations obtained by modifying various flow rates, after a time interval T preferably longer than the previous time interval $\Delta t$, so as not to slow down the simulation too much. $\Delta t=500$ s and T=2000 s are for example selected.

Figure 3:
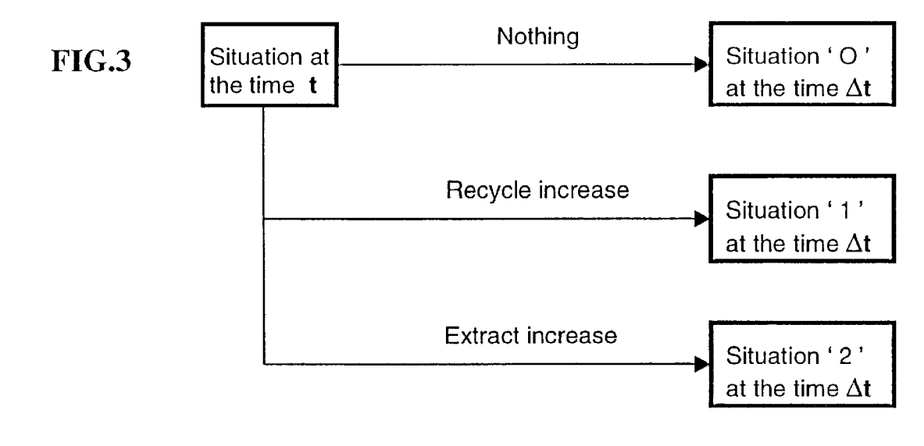

In the particular case illustrated in FIG. 3, three situations $S_0$, $S_1$ and $S_2$ respectively corresponding to the cases where no flow rate is changed, where only extract flow rate $Q_{Ex}$ is changed and where only recycle rate $Q_{Rec}$ is modified are compared at the time $(t+\Delta t)$. The optimizer determines, after each time interval, if each one of these flow rates has to be increased or reduced, for example for the recycle rate $Q_{Rec}$ measured in zone Z1, or for extract flow rate $Q_{Ex}$.

Instead of modifying extract flow rate $Q_{Ex}$ and recycle rate $Q_{rec}$, it is also possible (FIG. 4) to modify the flow rates of zones Z1 and Z4 and the flow rates of zones Z2 and Z3 separately. In order to modify the flow rates of zones Z1 and Z4 alone, extract flow rate $Q_{Ex}$ and recycle rate $Q_{rec}$ are increased by the same quantity. In order to modify the flow rates in zones Z2 and Z3 alone, extract flow rate $Q_{Ex}$ is decreased and recycle rate $Q_{Rec}$ is maintained constant.

Figure 4:
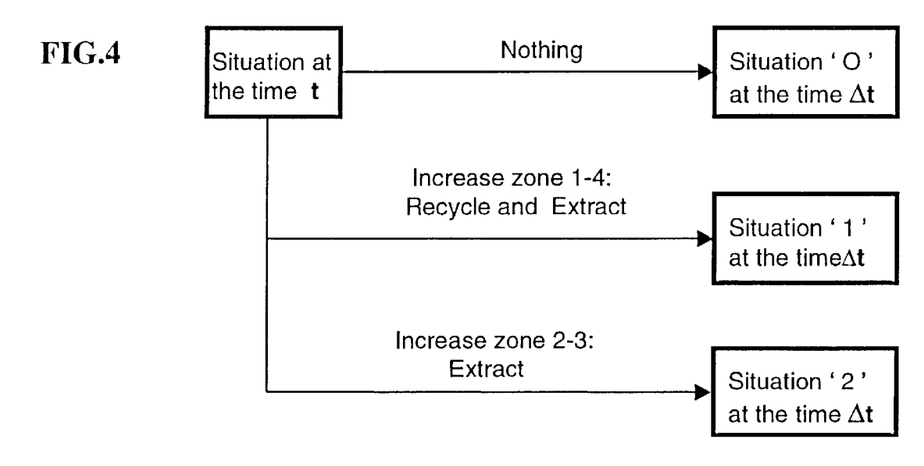
FIG. 4 is a variant of FIG. 3 which diagrammatically shows another case where three different situations resulting from simulations carried out after combined flow rate modifications are compared.

The next objective consists in comparing these situations $S_0$, $S_1$ and $S_2$ in order to determine the flow rate changes to be introduced and how to modify them. In fact, the difference between solution $S_0$, where nothing has been changed, and the other two solutions is compared: recycle increase $S_1$ or extract increase $S_2$, knowing that the extract and raffinate flow rates are changed anyway.

If the purity objective is not reached, the variation of each one of the two flow rates which minimizes the quantity of impurity converging to the extract (flow $F_p$) is selected. If the efficiency objective is not reached, the variation of each one of the two flow rates which minimizes the quantity of Px (paraxylene) converging to raffinate Raf (flow $F_R$) is selected. If both are satisfied, only one is maximized (purity in stand-alone mode or efficiency in hybrid mode).

If none of these objectives is satisfied, the combination allowing to reduce the net flow of impurities $F_P$ and to reduce the net flow $F_R$ is selected.

The net flow of impurities in each one of the two zones Z1 and Z2 must therefore be calculated. The sum of these flows is the flow entering extract Ex. The net flow of paraxylene Px coming from zone Z3 and that coming from zone Z4, which enter raffinate Raf, also have to be calculated.

Selection between the various situations is facilitated if two error functions, which are the two flows to be minimized, are defined. These error functions respectively measure:

the quantity of impurity ($Imp_{Ex}$) produced in the extract coming from zone Z1 plus the quantity of impurity ($Imp_{Ex}$) produced in the extract coming from zone Z2, and the quantity of paraxylene ($Px_{Raf}$) in the raffinate coming from zone Z3 plus the quantity of paraxylene ($Px_{Raf}$) in the raffinate coming from zone Z4.

The problem is that these flow calculations cannot be carried out simply in the case of a simulated countercurrent process (SCC) where the injection and draw-off points are periodically shifted. This process (SCC) therefore has to be replaced by a real countercurrent process (RCC), considering that the concentration profile obtained is that of a RCC process.

The net flows of impurities and of paraxylene Px are calculated at a point close to the extract and to the raffinate for each one of the four zones, by adding up the convective fluid flow rate, the adsorbed convective flow rate (linked with the porosity of the beds) and the diffusive fluid flow rate (linked with the concentration gradient).

Figure 6:
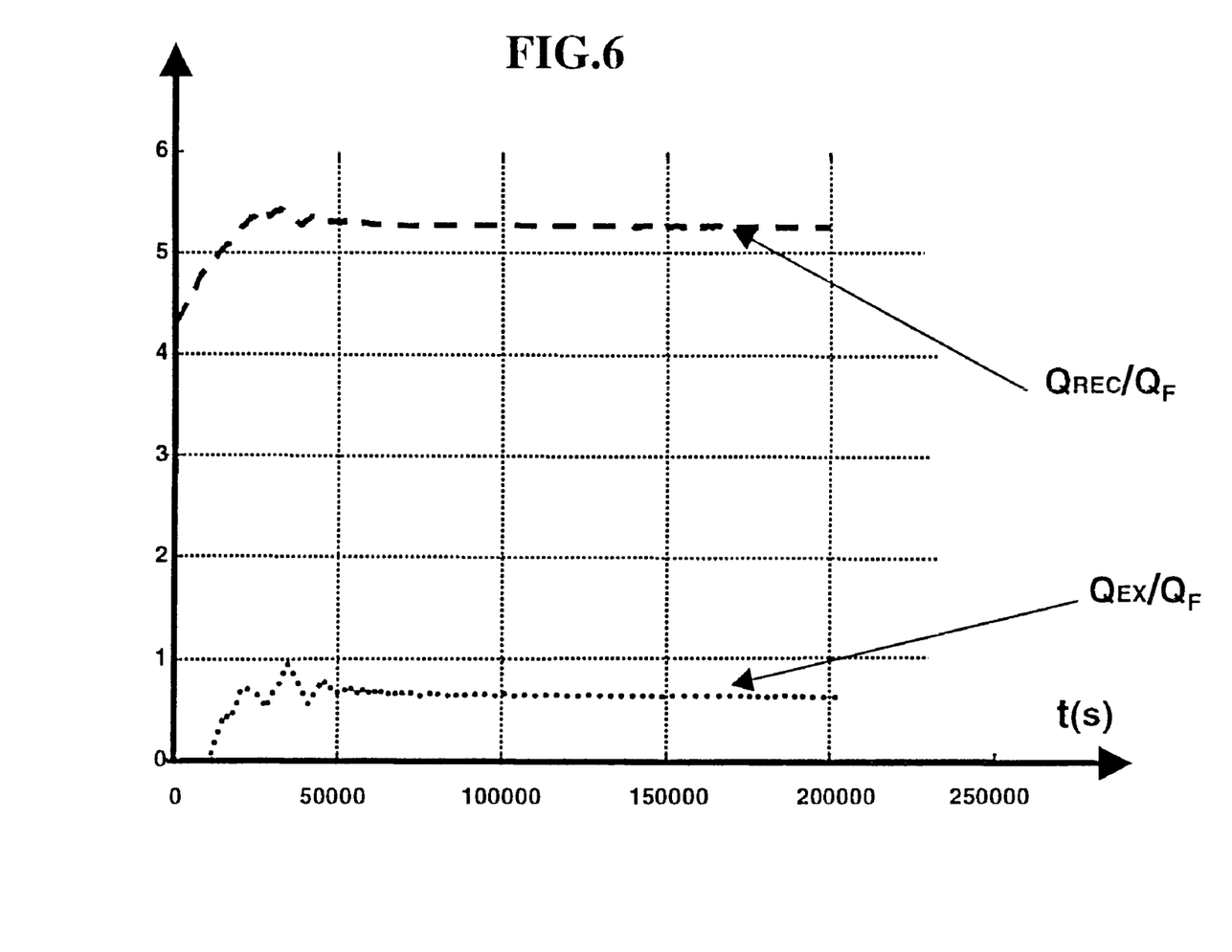
FIG. 6 shows an example of parallel variations as a function of the time of recycle rate $Q_{Rec}$ and of extract flow rate $Q_{Ex}$, in relation to feed flow rate $Q_F$, and FIGS. 7A, 7B respectively show local variations of purity P(t) and of efficiency R(t) respectively during the simulation.

The optimizer only gives the direction of variation of each one. At the beginning of the simulation, great variations of the order of some % are therefore preferably applied every time the optimizer is appealed to, in order to quickly reach a coarse adjustment. Then, as the simulation progresses, the amplitude of these variations is reduced so as to converge to a situation where each flow rate almost never varies any more, as can be seen in FIG. 6.

EXAMPLE

The significance of the process according to the invention will be clear from reading the example hereafter.

We consider a separation unit consisting of 24 beds. Solvent El is injected at the top of bed 1, extract Ex is withdrawn at the top of bed 5, feed F is injected at the top of bed 16 and raffinate Raf is withdrawn at the top of bed 22. These injection or extraction positions delimit four zones Z1, Z2, Z3 and Z4.

Figure 5:
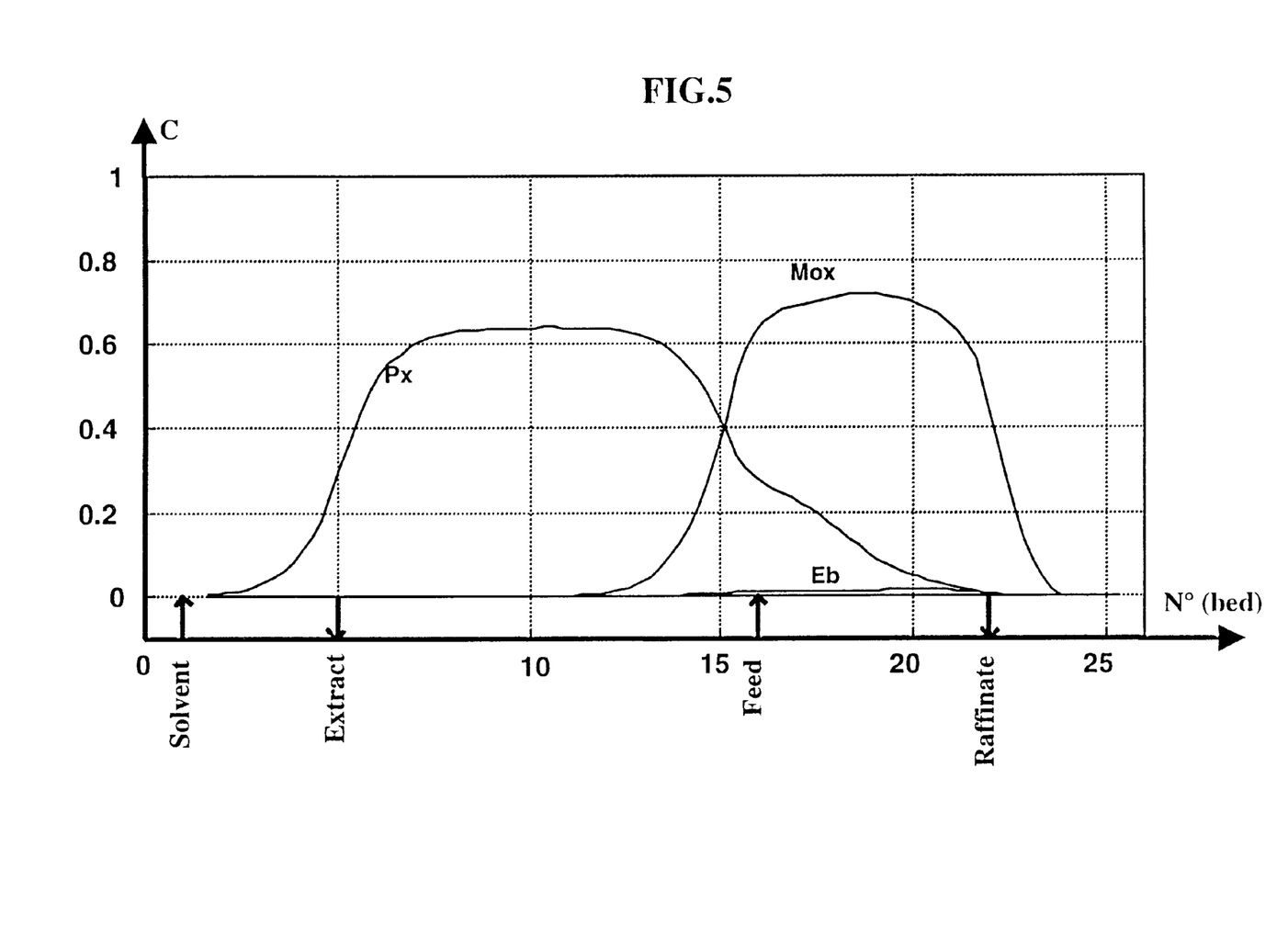
FIG. 5 shows an example of separation profiles obtained by applying the process, according to the position of the beds on the separation loop.

FIG. 5 shows the paraxylene (Px), meta and orthoxylene (Mox) and ethylbenzene (Eb) concentration profiles.

The optimized flow rates are the recycle rate $Q_{Rec}$ (calculated in zone Z1) and the extract flow rate $Q_{Ex}$. Feed flow rate $Q_F$ and eluent flow rate $Q_{El}$ are imposed, raffinate flow rate $Q_{Raf}$ is deduced by means of the material balance.

It can be seen in FIG. 5 that the optimizer has allowed to obtain a flow rate adjustment such that the separation of the Px and of the Mox is effective. It can be seen that the quantity of Mox (Mx and Ox) and of Eb <<entering>> the extract of bed 5 is almost zero. Similarly, the quantity of Px <<entering>> the raffinate of bed 22 is low. The optimizer has therefore modified the recycle and extract flow rate in zone Z1 (FIG. 6).

Figure 7A:
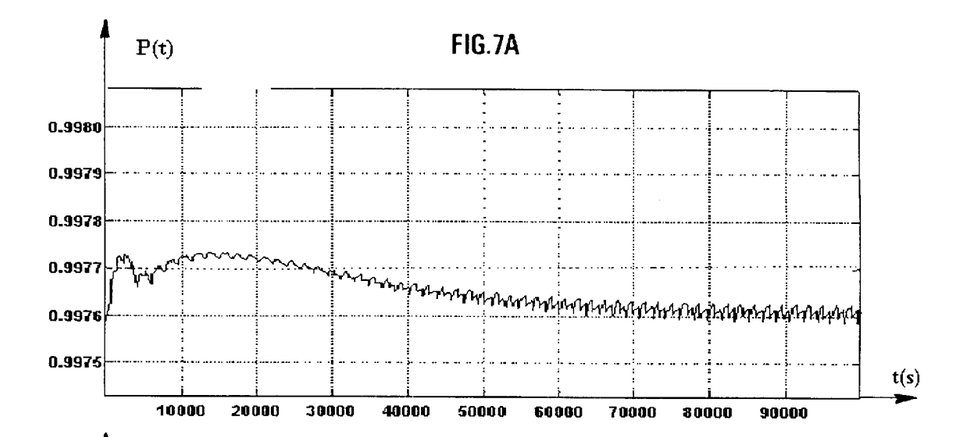
Figure 7B:
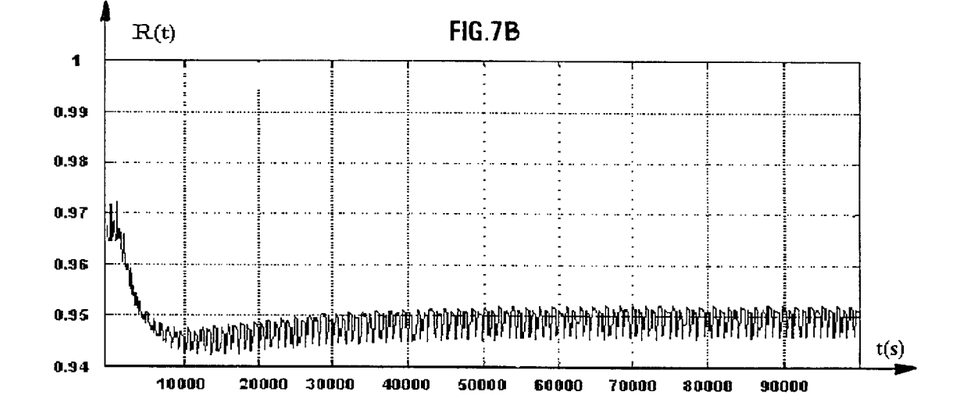

FIGS. 7A, 7B show the parallel evolutions obtained during an optimization, for the purity (FIG. 7A) and the efficiency R (FIG. 7B). The set value for the purity is Pc=0.9975 and that for the efficiency Rc is 0.95. It can be seen that the mean value of the efficiency R is in accordance with the set value Rc, whereas it has been posible to maximize the purity P (0.9976) above the set value Pc.

The process has been described in connection with a separation loop conventionally comprising four zones. It is however clear that it can apply to a loop comprising a different number of zones.

What is claimed is:

1. A process for controlling a simulated moving bed separation system comprising a series of beds containing adsorbent solid matter, divided into a plurality of zones delimited by injection points for a feedstock and for an eluant and extraction points for an extract and a raffinate, to obtain a set purity degree or a set extraction efficiency for at least one constituent in the extract, comprising:

A) performing a simulation cycle of the functioning of said separation system with n successive fluid flow rate rectification stages ($S_i(t+\Delta t)$, i=1 to n) carried out at finite time intervals $\Delta t$, each of the n successive fluid flow rate rectification stages starting from an initial situation ($Si(t)$) and having fluid flow rectification applied to at least one flow rate, comprising the steps of:

a) comparing the respective purity degrees or extraction efficiencies obtained after each of the rectification stages $S_i(t+\Delta t)$ with those obtained in a reference situation ($S_O(t+\Delta t)$) after a simulation stage without flow rate rectification, over the same time interval $\Delta t$, b) selecting, from among the fluid flow rectifications applied in each of the rectification stages $S_i(t+\Delta t)$, flow rate rectifications that minimize the quantity of impurities converging to the extract draw-off point as long as the set purity degree has not been reached, and c) selecting, from among the fluid flow rectifications applied in each of the rectification stages $S_i(t+\Delta t)$, flow rate rectifications that minimize the quantity of said at least one constituent converging to the raffinate draw-off point as long as the set extraction efficiency has not been reached;

B) calculating an updated initial situation $Si(t)$ based on the selected flow rate rectifications and iteratively repeating the simulation cycle from the updated initial situation using a finite time interval T; and C) feeding the feedstock and the eluant into the series of beds through the injection points, removing the extract from the extraction point for extract, removing raffinate from the extraction point for raffinate and controlling fluid flow rates at injection points and extraction points to minimize the quantity of impurities converging to the extract draw-off point or minimize the quantity of said at least one constituent converging to the raffinate draw-off point.

2. A process as claimed in claim 1, comprising selecting, from among the fluid flow rectifications applied in each of the rectification $S_i(t+\Delta t)$, flow rate rectifications that minimize the quantity of impurities converging to the extract draw-off point as long the set purity degree has not been reached, and selecting, from among the fluid flow rectifications applied in each of the rectification $S_i(t+\Delta t)$, flow rate rectifications that minimize the quantity of said at least one constituent converging to the raffinate draw-off point as long as both the set purity degree and the set efficiency have not been reached.

3. A process as claimed in claim 1, wherein n=2 and the flow rate rectification in one of the rectification stages comprises changing a recycle rate, and the flow rate rectification in another of the rectification stages comprises changing an extract flow rate.

4. A process as claimed in claim 1, wherein n=2 and the flow rate rectification in one of the rectification stages comprises changing a recycle rate and extract flow rate; and the flow rate rectification in another of the rectification stages comprises decreasing the extract flow rate while the recycle rate is kept constant.

5. A process as claimed in claim 1, wherein the plurality of zones comprises four zones (Z1 to Z4) and the method further comprises calculating from flows measured in each one of the four zones (Z1 to Z4) the net flow of impurities entering the extract coming from (Z1, Z2) on either side of the extract draw-off point and the net flow of said at least one constituent entering the raffinate coming from the two zones on either side of the raffinate draw-off point from flows measured in each one of the four zones (Z1 to Z4).

6. A process as claimed in claim 1, comprising changing the flow rate of the eluant.

7. A process as claimed in claim 1, wherein T is greater than $\Delta t$.

* * * * *